April 6, 1965    F. J. DIGESU ETAL    3,176,507
APPARATUS FOR STRESSING MEMBERS SUCH
AS TEST SPECIMENS AND THE LIKE
Filed Dec. 8, 1961    4 Sheets-Sheet 1
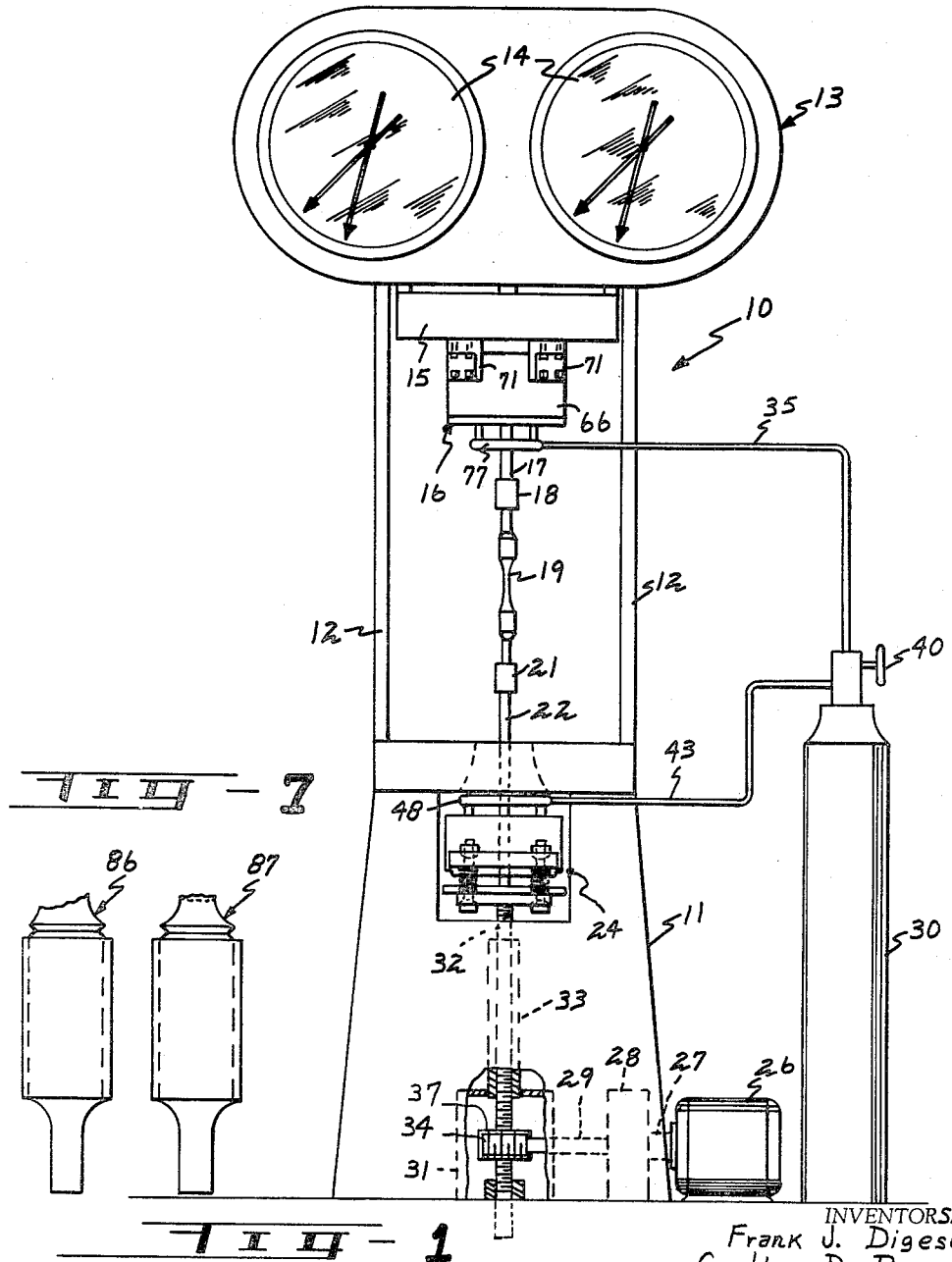
INVENTORS.
Frank J. Digesu
BY Coultas D. Pears
Attorneys

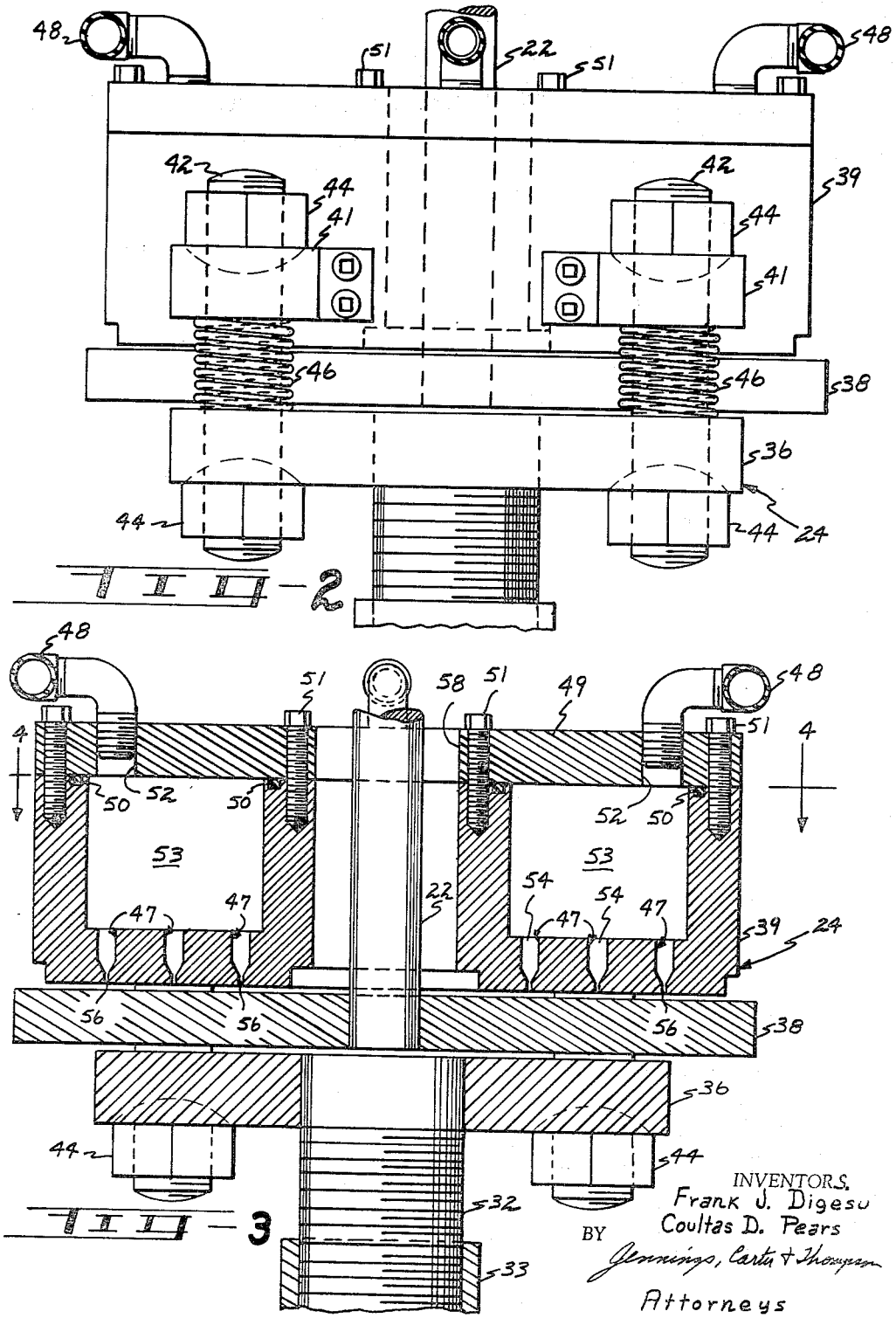

INVENTORS.
Frank J. Digesu
BY Coultas D. Pears
Jennings, Carter & Thompson
Attorneys

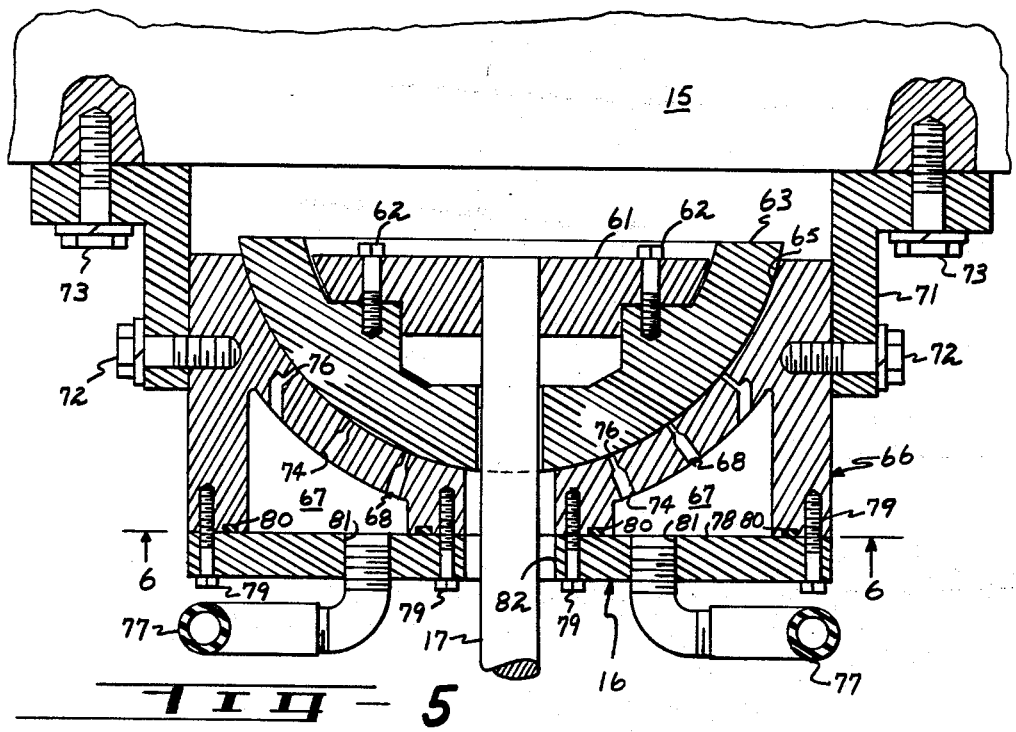
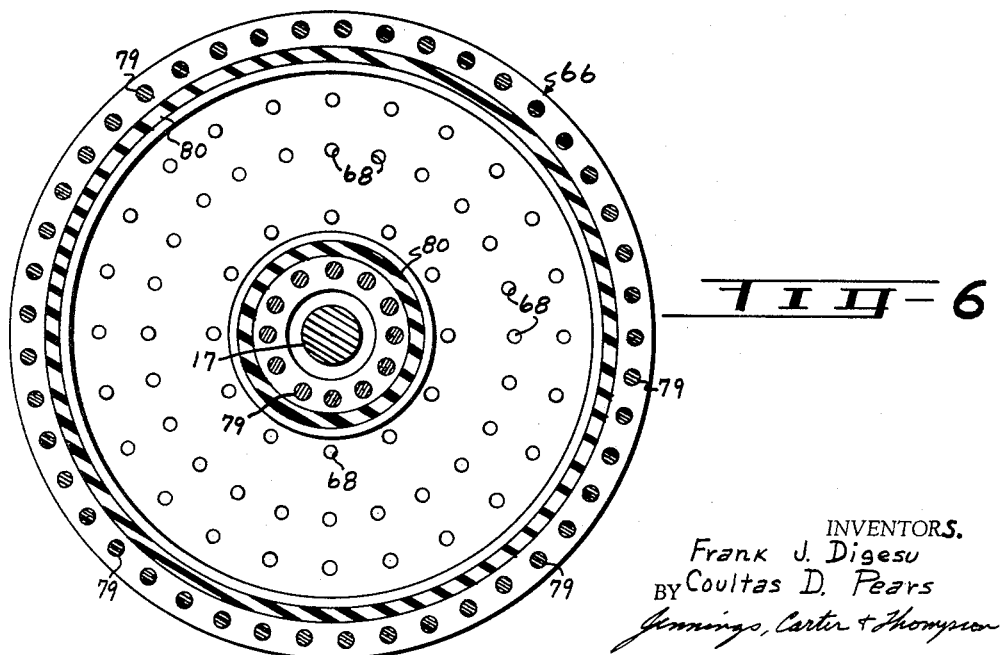

United States Patent Office 3,176,507
Patented Apr. 6, 1965

3,176,507
APPARATUS FOR STRESSING MEMBERS SUCH AS TEST SPECIMENS AND THE LIKE
Frank J. Digesu and Coultas D. Pears, Birmingham, Ala., assignors to Southern Research Institute, a corporation of Alabama
Filed Dec. 8, 1961, Ser. No. 157,955
3 Claims. (Cl. 73—103)

This invention relates to an apparatus to stress members and more particularly to a process and apparatus in which members are stressed by transmitting force thereto through a continuously flowing gas layer.

Heretofore, in the stressing of members, considerable effort and time have been required to align accurately an object to which a force is to be transmitted. Further, in practically every situation in which a tensile force has been transmitted to a member, such as a test specimen, there has been some bending force or some misalignment even though care has been exerted in the alignment of the member or object to be tested. In stress testing of objects, such as specimens of brittle material, a relatively small bending force results in inaccurate measurement of the tensile strength of the specimens. These bending forces, in prior testing apparatus, have been due to initial misalignment of the test specimen or object, or to friction in universal joints or pivots forming parts of the apparatus.

The present invention comprises substantially frictionless force transmitting means positioned adjacent opposite surfaces of the specimen to which an unidirectional force is to be transmitted and supporting the specimen for self-alignment upon application of the force. The force transmitting means being substantially frictionless permit alignment of the specimen in the direction of applied force so that practically no bending stress is applied. Thus, precise and accurate alignment of the specimen relative to the unidirectional forces being applied is obtained. Even though the specimen is nonaligned initially, when stressed unidirectionally it is free to align itself relative to the force without developing any bending, twisting, or other non-unidirectional stresses.

It is an object of this invention to provide an apparatus to stress members by transmitting force thereto by placing a continuously flowing or dynamic gas layer in force transmitting relation to the member and exerting force on the object through such gas layer.

A further object is to provide an apparatus to transmit an unidirectional force to an object for stressing thereof by placing the object directly between a pair of force transmitting dynamic gas layers and exerting force on the object through the gas layers.

Another object is to provide apparatus having at least one force transmitting means with relatively movable portions separated by a dynamic gas layer, one of the portions having an arcuate surface to permit the object to which the force is applied to move or tilt freely and without restraint, thereby to permit accurate alignment relative to the force without setting up bending or twisting movements in the object.

An additional object is to provide apparatus to transmit a substantially true uniaxial tensile force to a test specimen comprising upper and lower force transmitting means operatively connected to the test specimen therebetween, each of the force transmitting means having relatively movable portions separated by a dynamic gas layer through which the force is transmitted.

As an example of the effectiveness of the gas layer force transmitting means, a load of 5,000 pounds has been applied by our apparatus employing a steel linkage between upper and lower force transmitting means and the torque required to produce initial motion with the dynamic gas layer force transmitting means in operation was measured. The torque was found to be .0066 inch-pounds and the coefficient of friction was $4.5 \times 10^{-7}$. For brittle materials, apparatus not employing gas layer force transmitting means results in a stress distortion in which the maximum stress was 28% higher than the average stress across a plane normal to the uniaxial loading. In the present apparatus with dynamic gas layer force transmitting means, the stress distortion was reduced to only .002% of the average stress across a plane normal to the loading. Specimens ruptured by our improved process and apparatus were found to have a cone-shaped type of break perpendicular to the longitudinal axis which is indicative of pure tensile loading. Other specimens that were ruptured by apparatus not employing gas layer force transmitting means showed rupture planes that were not perpendicular to the longitudinal axis of the specimens. Such non-perpendicular rupture planes indicate the presence of bending stresses. As a result of eliminating practically all stress distortions, the ultimate strength of specimens tested in our improved apparatus was found to be from 25% to 200% higher than indicated by tests in the old type apparatus, depending on the type of material tested.

Apparatus illustrating the constructional features of our invention and which may be used to carry out our improved process is shown in the accompany drawings, forming a part of this application, in which:

FIG. 1 is an elevational view of apparatus to transmit an unidirectional force comprising our invention and showing a test specimen mounted between upper and lower gas layer force transmitting means;

FIG. 2 is an enlarged elevational view of the lower gas layer force transmitting means shown in FIG. 1;

FIG. 3 is a longitudinal sectional view of the lower gas layer force transmitting means shown in FIG. 2;

FIG. 5 is an enlarged longitudinal sectional view of the upper gas layer force transmitting means of the apparatus shown in FIG. 1;

FIG. 6 is a sectional view taken generally along the line 6—6 of FIG. 5 and showing the gas openings in the upper gas layer force transmitting means; and FIG. 7 is an elevational view of a pair of ruptured specimens, the left-hand one of the specimens being ruptured by apparatus not employing gas layer force exerting means and the right-hand one being ruptured by our improved apparatus.

Figure 4:
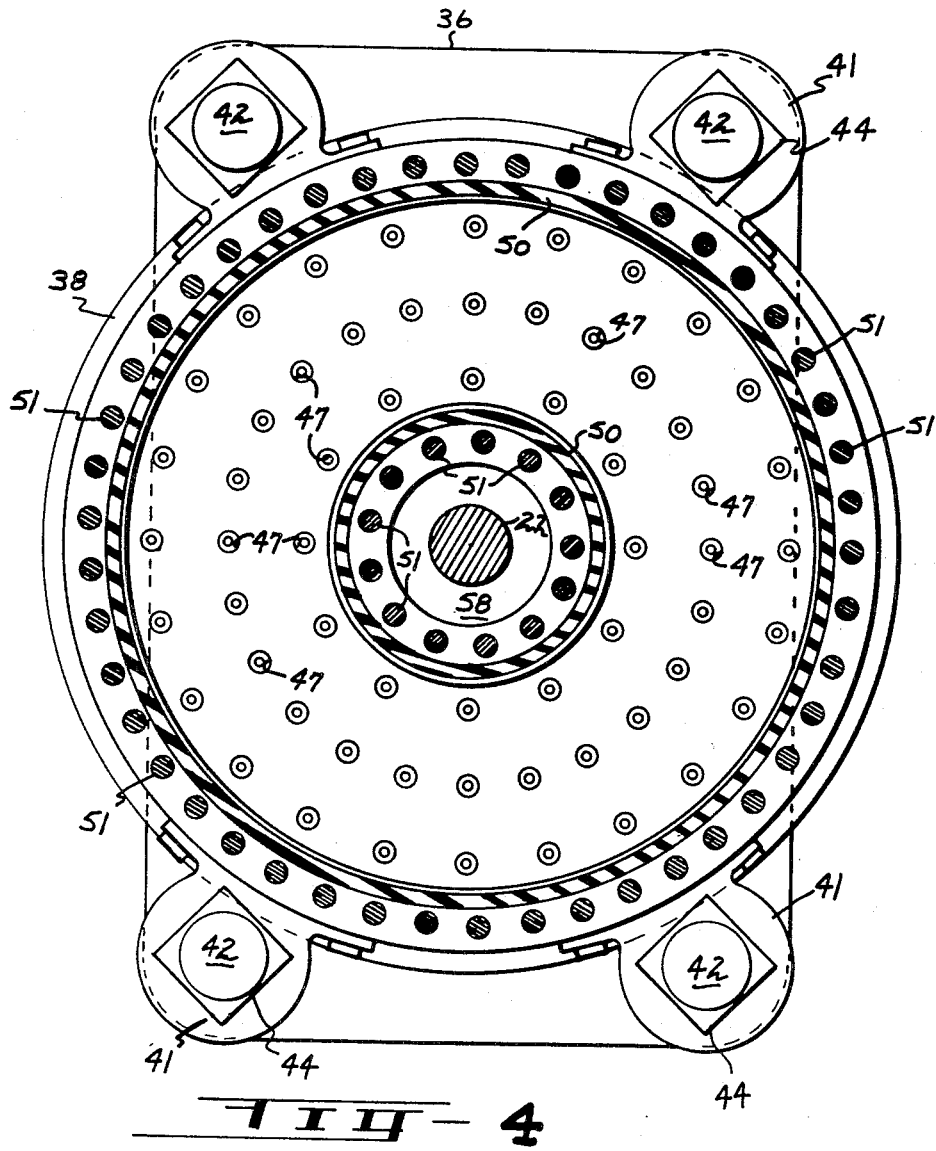
FIG. 4 is a sectional view of the lower gas layer force transmitting means taken generally along the line 4—4 of FIG. 3 and showing the gas openings through one portion of the force transmitting means.

Referring now to the drawings for a better understanding of our invention, we show in FIG. 1 apparatus largely in diagrammatic form to apply an unidirectional force to an object and indicated generally by the numeral 10. Apparatus 10 comprises a base frame 11 having vertical support members 12 extending upwardly therefrom. A frame 13 is mounted on the upper ends of supports 12 and load indicators 14 are supported on frame 13. An upper gas layer force transmitting means indicated generally by the numeral 16 is mounted adjacent the lower side of frame 13 on bearing support 15 and a pull rod 17 extends downwardly therefrom with an upper grip or chuck 18 on the lower end thereof to grip a test specimen indicated generally by the numeral 19. A lower grip or chuck 21 is connected to a pull rod 22 which is, in turn, connected to a lower gas layer force transmitting means indicated generally by numeral 24. A load is applied to specimen 19 through force transmitting means 16 and 24 in a manner later to appear.

Force exerting means to exert force on specimen 19 through force transmitting means 16 and 24 comprises a variable speed motor 26 having a drive shaft 27 extending to a reducer 28. Output shaft 29 extends from reducer 28 to a gear box 31. A screw 32 has a casing 33 thereabout and engages a ring gear 37 in threaded relation. Worm gear 34 on shaft 29 engages ring gear 37 to raise or lower screw 32.

Referring now to FIGS. 2 and 3 in which the lower gas layer force transmitting means 24 is shown in enlarged view, screw 32 is secured at its upper end to a load plate 36. Pull rod 22 is secured at its lower end to a movable plate 38 which is positioned between load plate 36 and a gas pressure ring 39. Bolt receiving brackets 41 are secured to the outer surface of pressure ring 39. Bolts 42 extend between openings in load plate 36 and brackets 41, and nuts 44 on the ends of bolts 42 secure load plate 36 and ring 39 to each other. A compression spring 46 is positioned about each bolt 42 between bracket 41 and load plate 36 and urges ring 39 away from load plate 36. Movable plate 38 is not secured to pressure ring 39 or load plate 36 in any manner and is free to move relative to ring 39 and plate 36. The position of plate 38 as shown in FIGS. 2 and 3 is the position during the operable position of apparatus 10 with a load being applied through load plate 36. Plate 38 in an inoperable position without any load being applied will rest on the upper surface of load plate 36.

A suitable gas such as nitrogen under pressure is provided in cylinder 30 controlled by a regulating valve 40. Gas line 35 leads to upper force transmitting means 16 and line 43 leads to lower force transmitting means 24. A sufficient pressure is provided to maintain a continuously flowing gas layer between the adjacent contact surfaces on upper force transmitting means 16 and lower force transmitting means 24. The detailed manner of connecting the gas lines will later be explained.

The pressure ring 39 has a plurality of gas openings 47 which are arranged in concentric rows as shown in FIG. 4. A cover plate 49 is secured to pressure ring 39 through screws 51, and O-ring seals 50 are provided between plate 49 and ring 39 while pressure inlet openings 52 therein receive gas from conduits 48. A central circumferential gas chamber 53 is thus provided adjacent openings 52. Openings 47 have large diameter inlets 54 and small diameter outlets 56 and are designed to provide gas jets emitting through outlets 56 so that a substantially constant clearance between plate 38 and ring 39 may be maintained under a range of load conditions. The pressure in chamber 53 may be varied to compensate for relatively large changes in loading conditions.

If the specimen is misaligned initially in the apparatus, when force is exerted an unequal pressure distribution develops across the bearing surface of plate 38 to displace plate 38 whereby any initial misalignment of the specimen is practically eliminated. When the specimen is properly aligned, a uniform pressure distribution is obtained across the "bearing area" of plate 38.

A central opening 58 extends through cover plate 49 and pressure ring 39. A suitable clearance is provided between rod 22 and opening 58 to allow plate 38 to move laterally or translate without pull rod 22 contacting the surfaces defining opening 58.

Upper gas layer force transmitting means 16 comprises a support plate 61 secured to the upper end of pull rod 17. Support plate 61 is secured by bolts 62 to a spherical surfaced member 63. Indicated generally by numeral 66 is a member having a spherical seat 65 which cooperates with the spherical surface of member 63. Formed in member 66 is an annular gas chamber 67 having a multiplicity of openings 68 passing through seat 65. Member 66 is secured to support frame 13 by angle members 71. Nuts 72 secured member 66 to angles 71 and nuts 73 secure angles 71 to support 15 of load support frame 13. Gas openings 68 are shaped to provide large diameter inlets 74 and small diameter outlets or orifices 76. The effective surface contact area of the gas layer between members 63 and 66 is substantially the same as the effective contact area of the lower force transmitting means 24. Also, openings 68 are of substantially the same size as and substantially equal in number to openings 47.

Gas chamber 67 is completed by an outer cover plate 78 secured to member 66 by screws 79. Openings 81 extend through plate 68 and gas is supplied to chamber 67 by means of a manifold 77 communicating with gas line 35. Seals 80 are mounted between plate 78 and member 66. A central opening 82 is provided through member 66 and cover plate 78 to freely pass pull rod 17. The diameter of opening 82 is substantially larger than the diameter of pull rod 17 so that pull rod 17 may tilt or move relative to member 66 without contacting the same.

As a specific example, force transmitting means 16 and 24 are around 9 inches in diameter to transmit a 15,000 pound load. To transmit loads up to this amount we find that sixty (60) generally equally spaced openings 47 and 68, distributed generally equally over a sixty (60) square inch effective gas layer "bearing area" for units 16 and 24 are satisfactory. For such apparatus a supply pressure of 900 p.s.i. is maintained in gas chambers 53 and 67 and this provides an effective pressure of around 300 p.s.i for a 15,000 pound load in the continuously flowing gas layers between members 38 and 39 and members 63 and 66. The effective pressure increases gradually as load is applied until it reaches 300 p.s.i. at the 15,000 pound load. The thickness of the gas layers between members 38 and 39 and members 63 and 66 is preferably .001 inch which is substantially constant throughout the loading range. Gas is supplied at a rate dependent on the load and reaches a maximum of 100 cubic feet per minute at 15,000 pound load. Bottled nitrogen is a suitable gas to employ. For the specific example being given outlets 56 and 76 should be about .020 inch in diameter and inlets 54 and 74 should be about .250 inch in diameter. The cooperating surfaces of force transmitting means 16 and 24 should be ground by lapping to a standard surface and then lapping to each other, or otherwise made as smooth and free of surface defects as possible. Thus, the cooperating surfaces of members 38 and 39 should be as plane and smooth as possible; similarly, the cooperating surfaces of members 63 and 66 should be as spherically complementary and smooth as possible.

In operation, before gas pressure is applied plate 38 is resting on load plate 36. A specimen 19 is secured in grips 18 and 21 provided on the ends of pull rods 17 and 22, respectively. When specimen 19 has been secured, motor 26 is energized to move screw 32 downwardly until just before a load is applied to specimen 19. Then, gas is released through gas lines 35 and 43 to gas chambers 53 and 67. Due to the flow of gas through openings 68, a dynamic gas layer under pressure is established between members 63 and 66, forcing them apart. The member 63 thus "floats" on the continuously flowing gas layer and may move or shift relative to member 66. Gas is applied through openings 47 of lower pressure ring 39 and similarly provides a dynamic gas layer under pressure between members 38 and 39. When motor 26 is energized to lower load plate 36, pressure ring 39 moves toward plate 38. However the pressure existing in the gas layer between plate 38 and pressure ring 39 as shown in FIGS. 2 and 3 is sufficient, within the load range of the apparatus to hold these members physically out of contact with each other. Initially, if the specimen 19 is not properly aligned between the two "floating" members 38 and 63, pull rod 17 may tilt or shift out of longitudinal alignment relative to the direction of force to be exerted. However, as the load is increased pull rod 17 will return to longitudinal alignment relative to the direction of force applied through the gas layers to the members 38 and 63. It will be noted that pull rod 22 is free to shift laterally in any direction within limits. Therefore, since the spherical surfaced member 63 may orient itself freely in any direction within limits, the specimen is subjected only to true, unidirectional or uniaxial stress.

The term "uniaxial" force as employed in this specification and claims is intended to mean that kind of force acting in a member under stress which is evenly distributed throughout the entire cross section of the member and is acting in the same direction throughout the member. The term "unidirectional" force as used in this specification and claims is intended to mean a force acting in one direction with practically no force acting in any other direction being present.

FIG. 7 is a fragmentary elevational view comparing two ruptured specimens. A specimen indicated generally by the numeral 86 was ruptured by apparatus not employing gas layer force transmitting means and the specimen indicated generally by the numeral 87 was ruptured by the present apparatus in which gas layer force transmitting means were employed. It should be noted that specimen 87 has a cone-shaped type of break which is generally perpendicular to the longitudinal axis and is indicative of pure tensile loading. Specimen 86 shows a rupture plane that is non-perpendicular to the longitudinal axis of the specimen which indicates the presence of some bending stresses occasioned by uneven stressing in part of the cross section of the specimen. Specimen 86 was initially aligned in its apparatus more carefully than was specimen 87 in our improved apparatus.

From the foregoing, it will be understood that we have provided an apparatus to stress a member by transmitting force thereto through a continuously flowing force transmitting gas layer in force transmitting relation to the member, and exerting force on the member through such layer of gas. The member or object to which the force is to be transmitted may be positioned between a pair of dynamic gas layers and force transmitted to the object is entirely through the gas layers whereby substantially all bending stress and non-uniaxial loading are eliminated. Gas layer force transmitting means having cooperating surfaces separated by continuously flowing gas layers are positioned adjacent the ends of an object, such as an elongated specimen to which an uniaxial tensional force is to be applied, and the specimen is thereby mounted for rotation about its longitudinal axis as well as tilting relative to its longitudinal axis. Since the specimen is mounted for movement on the gas layers, the specimen may translate as well as rotate without any substantial bending stresses being applied from loading conditions. Even though the specimen is not aligned properly when initially placed in our apparatus, the specimen will automatically align itself when load is applied through its movement on the gas layer force transmitting means.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. In apparatus for testing the tensile strength of specimens having a longitudinal axis and a given cross sectional area,
   (a) means connected to one end of the specimen and holding it against axial movement,
   (b) a first member operatively secured to the other end of the specimen and having a surface extending generally symmetrically and generally perpendicular to said longitudinal axis, said surface having an area larger than the cross sectional area of the specimen,
   (c) a second member having a surface substantially coextensive with and facing the said surface of said first member and separated therefrom by a film of gas continuously supplied from a source under pressure, and
   (d) means to apply a force to said second member in a direction so as to tend to decrease the thickness of the film of gas between the said surfaces of the first and second members, thereby to exert longitudinal pull on the specimen.

2. In apparatus for testing the tensile strength of specimens having a longitudinal axis and a given cross sectional area,
   (a) spaced apart members operatively connected to opposite ends of the specimen and having facing surfaces greater in area than the cross sectional area of the specimen and extending generally symmetrically and generally perpendicularly to the longitudinal axis of the specimen,
   (b) cooperating members having surfaces generally coextensive in area with and facing the said surfaces of the spaced apart members and separated therefrom by films of gas continuously supplied from a source under pressure,
   (c) means holding one of said cooperating members against movement in a direction axially of the specimen, and
   (d) means to apply a force to the other of said cooperating members in a direction so as to tend to decrease the thickness of said films of gas between the said surfaces of said members, thereby to exert longitudinal pull on the specimen.

3. Apparatus as defined in claim 2 in which the facing surfaces of one of said spaced apart members and its cooperating member are partially spherical, whereby substantially true rectilinear pull is exerted on the specimen.

References Cited by the Examiner
UNITED STATES PATENTS

| | | | |
|---|---|---|---|
| 2,854,053 | 9/58 | Salter | 73—97 |
| 2,909,061 | 10/59 | Gelbach et al. | 73—147 |
| 2,915,902 | 12/59 | Brugger | 308—9 |
| 3,005,336 | 10/61 | Wyman | 73—103 |
| 3,044,149 | 7/62 | Conlon | 308—9 |

RICHARD C. QUEISSER, *Primary Examiner.*

DAVID SCHONBERG, *Examiner.*